United States Patent [19]

Song

[11] Patent Number: 5,757,245

[45] Date of Patent: May 26, 1998

[54] CIRCUIT FOR 2-LEVEL/4-LEVEL FREQUENCY SHIFT KEY MODULATION

[75] Inventor: Ju-Tae Song, Seoul, Rep. of Korea

[73] Assignee: SamSung Electronics Co., Ltd., Kyungki-do, Rep. of Korea

[21] Appl. No.: 780,136

[22] Filed: Dec. 26, 1996

[30] Foreign Application Priority Data

Dec. 26, 1995 [KR] Rep. of Korea ............... 56575/1995

[51] Int. Cl.$^6$ .................. H03C 3/00; H03K 7/06; H04L 27/12
[52] U.S. Cl. ........................... 332/100; 375/303
[58] Field of Search .................. 332/100–102; 375/303–307

[56] References Cited

U.S. PATENT DOCUMENTS

| | | | |
|---|---|---|---|
| 4,368,439 | 1/1983 | Shibuya et al. | 332/100 |
| 4,408,135 | 10/1983 | Yuyama et al. | 307/474 |
| 4,481,642 | 11/1984 | Hanson | 375/303 |
| 5,329,258 | 7/1994 | Matsuura | 332/100 |
| 5,377,229 | 12/1994 | Wilson et al. | 375/9 |
| 5,450,023 | 9/1995 | Yang et al. | 326/60 |

*Primary Examiner*—David Mis
*Attorney, Agent, or Firm*—Robert E. Bushnell, Esq.

[57] ABSTRACT

A circuit for two-level/four-level frequency shift keying modulation, which may be used for a paging transmitter, is compatible with earlier two-level non-return to zero frequency shift keying modulation circuits and includes: a voltage leveling circuit for generating four voltage levels to selectively allow the two-level and four-level frequency shift keying modulation; a decoder for decoding the least significant bit and most significant bit data inputs to generate a decoded signal output; an analog switch for selecting the four voltage levels in accordance with the two-level or four-level frequency shift keying modulation, in response to the decoded signal; an adder for adding the selected voltage level to a reference voltage to generate a corresponding digital output voltage; an audio amplifier for amplifying an audio signal input; an input/filter selector for selecting the digital output voltage or the amplified audio signal in response to an input selection control signal and for selecting one of two filtering paths of a following stage in association with a control signal for selecting the two-level or four-level frequency shift keying modulation to generate the selected digital output voltage or the amplified audio signal via the selected filtering path; and a baseband filter for performing a first or a second filtering with a respective bandwidth for the two-level or four-level frequency shift keying modulation and for filtering the digital output voltage or the audio signal supplied through the selected one of the filtering paths.

3 Claims, 2 Drawing Sheets

CIRCUIT FOR 2-LEVEL/4-LEVEL FREQUENCY SHIFT KEY MODULATION

CLAIM OF PRIORITY

This application makes reference to, incorporates the same herein, and claims all benefits accruing under 35 U.S.C. §119 from an application for CIRCUIT FOR 2-LEVEL/4-LEVEL FREQUENCY SHIFT KEYING MODULATION earlier filed in the Korean Industrial Property Office on the 26th of Dec. 1995 and there duly assigned Serial No. 56575/1995.

BACKGROUND OF THE INVENTION

1. Field of the Invention

The present invention relates generally to radio paging systems, and, more particularly, to modulation circuits and processes used for paging telecommunications transmission.

2. Description of the Related Art

A paging transmitter used for a radio paging system employs a 2-level frequency shift keying (hereinafter, referred to as "FSK") modulation, which generates a voltage corresponding to "mark" when the FSK data is at the "1" state and a voltage corresponding to "space" when the FSK data is at the "0" state, to provide a voltage controlled oscillator with the modulated voltage so as to evaluate a deviation. 2-level NRZ FSK modulation supplied to the paging transmitter however, has a maximum transmission speed of 2,400 bits per second at the most, which is too low to meet a requirement for the fast data transmission in the recent high value-added communication services.

SUMMARY OF THE INVENTION

It is therefore an object of the present invention to provide a circuit and process for 4-level frequency shift keying (FSK) modulation.

It is another object of the present invention to provide a circuit for 2-level/4-level FSK modulation, being compatible with the earlier system.

According to an aspect of the present invention, a modulation circuit used for a paging transmitter includes a voltage leveling circuit for generating four voltage levels to selectively allow 2-level and 4-level frequency shift keying (FSK) modulations; a decoder for decoding first and second data inputs to generate a decoded signal output; a selector for selecting any ones of the four voltage levels associated with the 2-level or 4-level FSK modulation, in response to the decoded signal; an adder for adding the selected voltage level to a reference voltage to generate a corresponding digital output voltage; a filter selector for selecting one of two filtering paths of a filter in accordance with a control signal for selecting the 2-level or 4-level FSK modulation, the control signal being supplied either internally or externally, to generate a selected one of the digital output voltage and amplified audio signal via the selected filtering path; and the filter performing a first or second filtering with a bandwidth for the 2-level or 4-level FSK modulation, and filtering the digital output voltage or the audio signal supplied through the selected one of the filtering paths.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
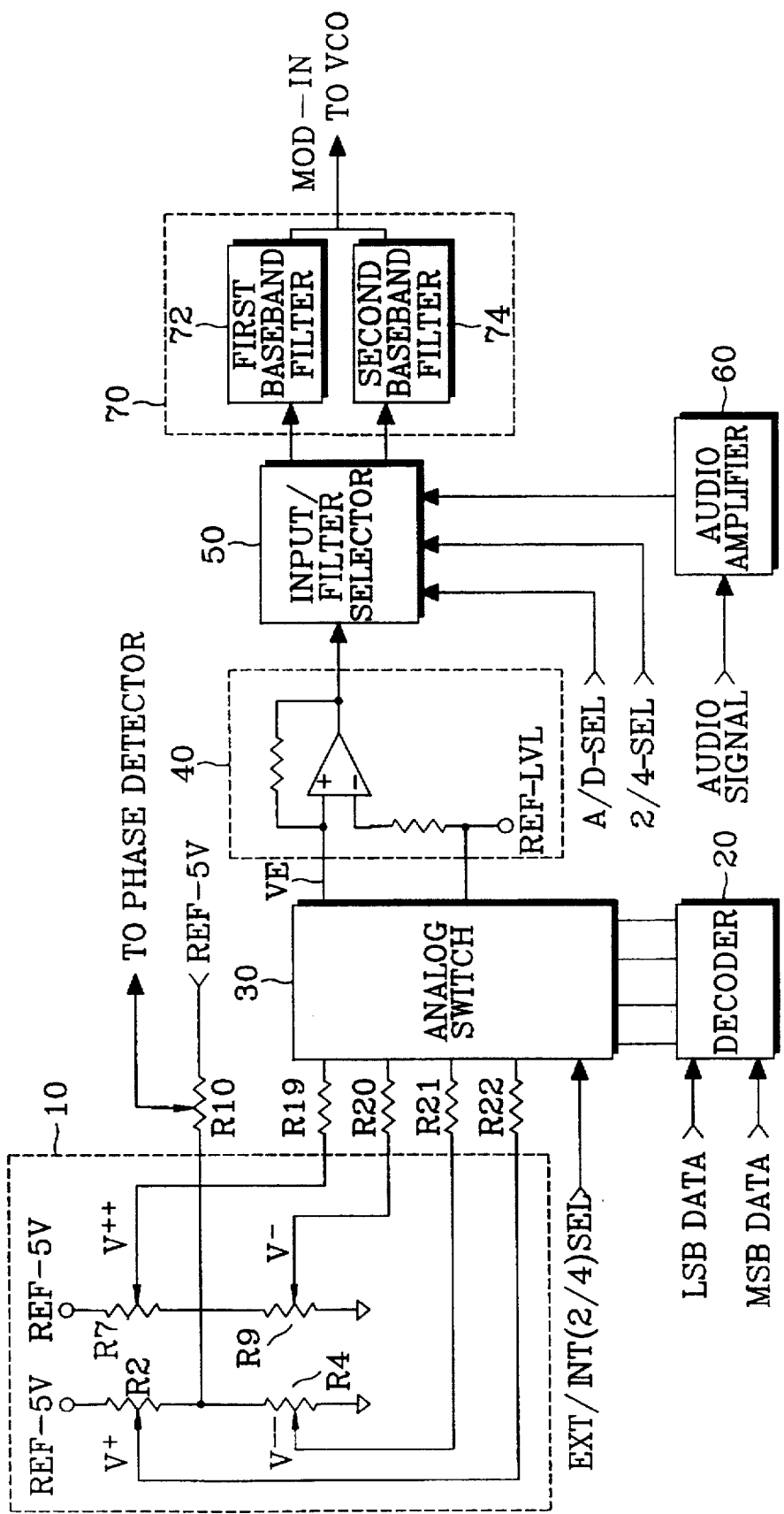
FIG. 1 illustrates a circuit for two-level/four-level frequency shift keying modulation constructed as one embodiment according to the principles of the present invention.

Referring to FIG. 1, a circuit for implementing two-level/four-level frequency shift keying (i.e., FSK) modulation in one embodiment of the present invention includes a voltage leveling circuit 10 for generating four voltage levels to selectively allow the 2-level and 4-level FSK modulations, a decoder 20 for decoding the LSB (Least Significant Bit) and MSB (Most Significant Bit) data inputs to generate a decoded signal output, an analog switch 30 for selecting the four voltage levels in accordance with the 2-level or 4-level FSK modulation, in response to the decoded signal, an adder 40 for adding the selected voltage level to a reference voltage to generate a corresponding digital output voltage, an audio amplifier 60 for amplifying an audio signal input, an input/filter selector 50 for selecting the digital output voltage or the amplified audio signal in response to an input selection control signal and for selecting one of two filtering paths of a following stage in accordance with a control signal for selecting the 2-level or 4-level FSK modulation to generate the selected digital output voltage or the amplified audio signal via the selected filtering path, and a baseband filter 70 for respectively performing a first or second filtering with a bandwidth for the 2-level or 4-level FSK modulation and for filtering the digital output voltage or the audio signal supplied through the selected one of the filtering paths.

Figure 2:
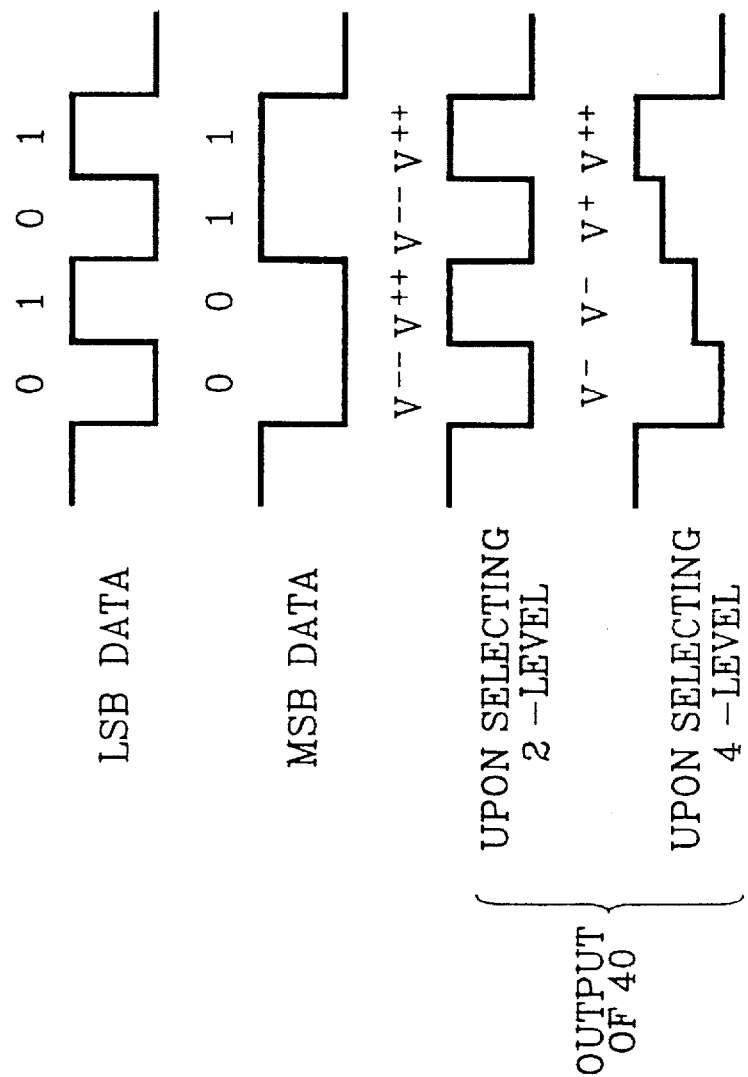
FIG. 2 is a timing diagram showing two-level and four-level output voltages generated via an adder after being selected by an analog switch in response to least significant bit and most significant bit data inputs.

Now, referring to FIGS. 1 and 2, the decoder 20 decodes the binary LSB and MSB data inputs to provide the analog switch 30 with the decoded signal (00, 01, 10, 11). The voltage leveling circuit 10 having resistors R2, R4, R7, R9 connected to a reference voltage REF-5 V of 5 V respectively provide the analog switch 30 with voltage levels $V^{++}$, $V^{+}$, $V^{-}$, $V^{--}$. The resistors R2, R4, R7, R9 are variable resistors so that the voltage levels may be controlled precisely as needed. For instance, it is preferable that the voltage levels are respectively set as $V^{++}=2.77$ V, $V^{+}=2.59$ V, $V^{-}=2.35$ V, and $V^{--}=2.13$ V.

The analog switch 30 selects one of the voltage levels $V^{++}$, $V^{+}$, $V^{-}$, $V^{--}$ generated from the voltage leveling circuit 10, in response to the decoded signal (00, 01, 10, 11) from the decoder 20. For instance, the voltage level $V^{--}$ is selected when the decoded signal is "00", $V^{-}$ when the decoded signal is "01", $V^{+}$ when the decoded signal is "10", and $V^{++}$ when the decoded signal is "11". Therefore, 2-level mode ($V^{++}$, $V^{--}$) or 4-level mode ($V^{++}$, $V^{+}$, $V^{-}$, $V^{--}$) can be freely selected, in response to decoded signal.

Furthermore, the analog switch 30 can select the 2-level mode or 4-level mode internally or externally. Namely, the analog switch 30 selects one of the voltage levels $V^{++}$, $V^{+}$, $V^{-}$, $V^{--}$ generated by the voltage leveling circuit 10 in response to an EXT/INT(2/4)SEL signal. Thus, the 2-level or 4level mode can be freely selected according to the EXT/INT(2/4)SEL signal. The voltage levels selected by the analog switch 30 are added to a reference voltage REF-LVL by the adder 40 to generate a corresponding digital voltage level to the input/filter selector 50. The input/filter selector 50 receives the audio signal amplified by the audio amplifier 60 as well as the voltage level corresponding to the digital voltage output of the adder 40. Further, the input/filter selector 50 receives an A/D-SEL signal for selecting one of the input signals and a 2/4-SEL signal for selecting the filters of the following stage (i.e., the baseband filter 70) according to the 2-level mode or 4-level mode. In this way, the input/filter selector 50 selects one of the two input signals in response to the A/D-SEL signal, and selects a first baseband filter 72 or a second baseband filter 74 of the baseband filter 70 in response to the 2/4-SEL signal. Therefore, the voltage levels generated by the adder 40 pass through the first or second baseband filter 72 or 74 via the input/filter selector 50 according to the 2-level or 4-level mode. The output signals of the first and second baseband filters 72 and 74 are supplied to a modulation input terminal MOD-IN of a following stage, e.g., a voltage controlled oscillator (not shown).

Referring again to FIG. 2, illustrated is a timing diagram showing the 2-level and 4-level output voltages generated by the adder (40) after being selected by an analog switch (30) in response to the LSB and MSB data inputs. It should be noted that selecting the 2-level and 4-level modes is achieved in response to the EXT/INT(2/4)SEL signal supplied thereto internally or externally, as stated above. For instance, the 2-level mode is selected when the EXT/INT (2/4)SEL signal is at a logic low state, and the 4-level mode is selected when the EXT/INT(2/4)SEL signal is at a logic high state.

It can be appreciated from the descriptions that the present invention is compatible with the conventional 2-level non-return to zero frequency shift keying (i.e., NRZ FSK) modulation and further, is switchable between the 2-level and 4-level FSK modulation modes, thus being suitable for the fast data transmission by simply switching the modulation mode to the 4-level FSK modulation. Moreover, switching between the 2-level and 4-level modulation modes is possible internally or externally, so that the modulation modes may be easily switchable without a modification of the modulation circuit.

The preferred embodiment is given by way of example, and as a means for explaining the use and making of the present invention. The embodiment is subject to a routine modification by those of ordinary skill in the art. The present invention is not limited to the illustrative embodiments, but is defined by the appended claims.

What is claimed is:

1. A modulation circuit, comprising:

a voltage leveling circuit for generating four voltage levels to selectively allow two-level and four-level frequency shift keying modulation;

a decoder for decoding first and second data inputs to generate a decoded signal output;

a selector for selecting one of said four voltage levels in accordance with the two-level or four-level frequency shift keying modulation, in response to said decoded signal;

an adder for adding said selected voltage level to a reference voltage to generate a corresponding digital output voltage;

an audio amplifier for amplifying an audio signal input;

an input/filter selector for selecting said digital output voltage or said amplified audio signal in response to an input selection control signal, and for selecting one of two filtering paths of a filter in accordance with a control signal for selecting the two-level or four-level frequency shift keying modulation to generate a selected one of said digital output voltage and amplified audio signal via the selected filtering path; and said filter for performing a first or a second filtering with a respective bandwidth for the two-level or four-level frequency shift keying modulation, and filtering said digital output voltage or said audio signal supplied through said selected one of said filtering paths.

2. A modulation circuit, comprising:

a voltage leveling circuit for generating four voltage levels to selectively allow two-level and four-level frequency shift keying modulation;

a decoder for decoding first and second data inputs to generate a decoded signal output;

a selector for selecting one of said four voltage levels in accordance with the two-level or four-level frequency shift keying modulation, in response to said decoded signal;

an adder for adding said selected voltage level to a reference voltage to generate a corresponding digital output voltage;

a filter selector for selecting one of two filtering paths of a filter in accordance with a control signal for selecting the two-level or four-level frequency shift keying modulation, said filter for performing a first or a second filtering with a respective bandwidth for the two-level or four-level frequency shift keying modulation, and filtering said digital output voltage supplied through said selected one of said filtering paths.

3. A modulation circuit, comprising:

a voltage leveling circuit for generating four voltage levels to selectively allow two-level and four-level frequency shift keying modulation;

a selector for selecting one of said four voltage levels in accordance with the two-level or four-level frequency shift keying modulation, in response to a selection control signal for selecting the two-level or four-level frequency shift keying modulation;

an adder for adding said selected voltage level to a reference voltage to generate a corresponding digital output voltage;

a filter selector for selecting one of two filtering paths of a filter in accordance with said selection control signal, said filter performing a first or a second filtering with a respective bandwidth for the two-level or four-level frequency shift keying modulation, and filtering said digital output voltage supplied through said selected one of said filtering paths.

* * * * *